Sept. 27, 1955    M. O. LONGSTRETH ET AL    2,718,658
FILM STRETCHING DEVICE

Filed Oct. 5, 1953    2 Sheets-Sheet 1

INVENTORS.
Murrey O. Longstreth
Daniel W. Ryan
BY
Griswold & Burdick
ATTORNEYS

INVENTORS.
Murrey O. Longstreth
BY Daniel W. Ryan

Griswold & Burdick
ATTORNEYS

United States Patent Office 2,718,658
Patented Sept. 27, 1955

2,718,658
FILM STRETCHING DEVICE

Murrey O. Longstreth, Midland, Mich., and Daniel W. Ryan, Palos Verdes Estates, Calif., assignors to The Dow Chemical Company, Midland, Mich., a corporation of Delaware Application October 5, 1953, Serial No. 384,125

4 Claims. (Cl. 18—1)

This invention relates to an improved device for the stretching or orienting of foils and film, and particularly to means for assuring uniformity of gauge of biaxially oriented polystyrene film.

Films and foils made of certain thermoplastic polymers are highly useful. For example, as described in U. S. Patent 2,074,285, the films made from polystyrene are very valuable as an insulating tape for wrapping electrical cables. Unplasticized polystyrene in its usual state is very brittle, but it is known that when the molecules of polystyrene are arranged or oriented in a certain manner in thin films, the films are flexible and can be readily wound around cables and the like. To accomplish this orientation, it is necessary to stretch the material biaxially during production of the film. Various devices have been made for attaining the desired orientation. One of these has been reported by H. Horn in Kunststoffe, 30 p. 53 (1940). In the method described by Horn, a polystyrene tube is expressed through a circular die and over a divergent spreader mandrel which has a plurality of parallel rollers along its periphery to aid in minimizing the friction between the mandrel and the sliding film. A pair of rolls is located beyond the mandrel and perpendicular to the direction of travel of the film. By operating these rolls at a peripheral speed greater than the speed of the plastic through the die, a simultaneous longitudinal stretch combined with the transverse stretch applied by the mandrel provides the proper biaxial orientation of the polystyrene molecules to attain the desired flexible film. However, when it is attempted to make wide sheets of thin film (1 mil or less) using the above apparatus, many difficulties are encountered. Not the least important of these is a variation in the gauge of the film across its width. To be useful for commercial purposes, a film must have a uniform thickness.

It is an object of this invention to provide an improved film stretching device for imparting a biaxial orientation to a thermoplastic film.

It is a further object to provide an improved film stretching device for producing thermoplastic films having a uniform gauge.

It has now been found that thermoplastic films of uniform gauge may be produced by means of a modification of the previously described machine in which heat reflecting plates are mounted in a plane parallel to the plane surfaces of the film forming mandrel, and at a distance not to exceed 2 inches from the path of the stretched film, in position to reflect heat radiated from the film back to such areas of the film surface as tend to be too thick. Such strategically located reflecting plates equalize the plasticity of the film, by proper heat distribution across its face, and allow the film to be stretched uniformly.

For ease of understanding, there will first be described the prior apparatus to be improved.

The machine of which this invention is an improved modification consists of a means for expressing a thermoplastic material through a circular die 10, or other means of supplying an unoriented tubular film, and a divergent spreader mandrel 11 aligned with and attached to the core of the die 10. When so attached, spreader mandrel 11 will be completely within the tube of material. The useful divergent edges of the mandrel 11 may be straight or convex, spreading out symmetrically from the end at which the film is fed onto the spreader mandrel 11. Concave edges do not give the desired results.

Figure 1:
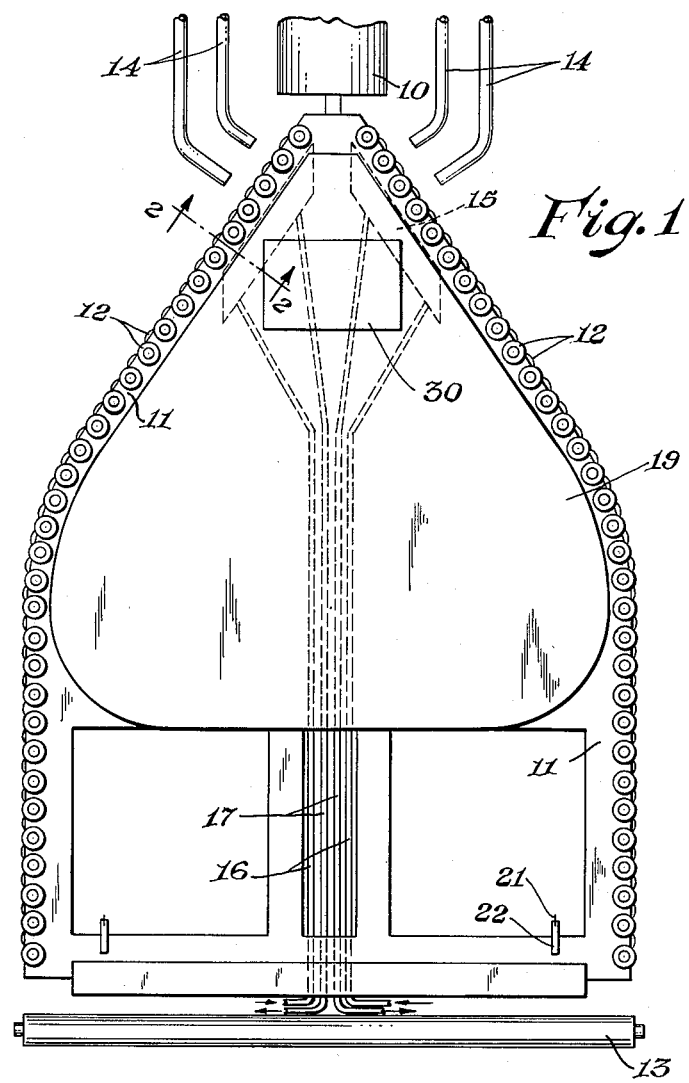
Fig. 1 is a front elevation of the machine, with the reflecting plate shown in outline.
Figure 2:
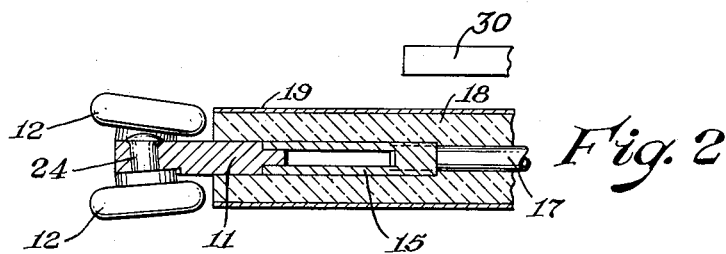
Fig. 2 is a fragmentary cross-sectional view along line 2—2 of Fig. 1.

Disposed along the outer edges and on both sides of the mandrel 11 from a point near die 10 are freely rotating, rollers 12 which facilitate conveying the tube past the outer edges of the mandrel 11 without frictional drag. It is preferred that the rollers 12 on one face of the mandrel 11 be in staggered relationship to the rollers 12 on the other face of the mandrel 11. Rollers 12 may be mounted on mandrel 11 by means of peened stub shafts 24 (Fig. 2). Such an arrangement provides maximum support for the hot moving film.

A pair of driven rolls 13 is located beyond the spreader mandrel 11 and extends the width of the mandrel 11, in position to engage the stretched and flattened tube. By operating the rolls 13 at a peripheral speed greater than the speed at which the polymer is being extruded, the rolls provide longitudinal stretch to the film at the same time as the radial stretch imparted by the mandrel 11.

It is preferred to cool the hot film issuing from the die 10 at the points where the film will contact the rollers 12 to prevent it from sticking thereto. A suitable means for cooling the film is a plurality of air jets 14 mounted a short distance away from and in the plane of spreader mandrel 11, so that air streams may be directed at the tube of polymer as it moves over the edge of the mandrel 11. To supplement the cooling effects of the air jets 14, it is preferred to provide a water-jacketed mandrel. An especially suitable form of such a mandrel is described in our copending application, Serial No. 327,363, filed December 22, 1952, now Patent 2,697,248. In this preferred embodiment water jackets 15 are installed in the edges of the mandrel 11 nearest die 10. Water intake 16 and outlet 17 tubes are connected to jackets 15 so that continuous circulation of a heat transfer liquid is possible.

Since it is desired to cool the film only at the edges of mandrel 11, it is necessary to insulate the other parts of mandrel 11. A suitable means of accomplishing this insulation is described in our copending application, Serial No. 327,363, filed December 22, 1952. In the embodiment described in that application, a layer 18 of insulating material, such as glass wool, covers mandrel 11, extending at least as low as the lower edge of the water jacket 15, and as wide as the distance between the rollers 12. A smooth cover sheet 19, of stainless steel or other suitable material, holds the insulating material in position.

The tube of stretched polymer is commonly slit into two flat sheets. Suitable means for slitting the tube are described in our copending application, Serial No. 327,362, filed December 22, 1952, and comprise sharp edged cutting devices 21, such as razor blades, mounted in brackets 22 rigidly attached to spreader mandrel 11.

Figure 3:
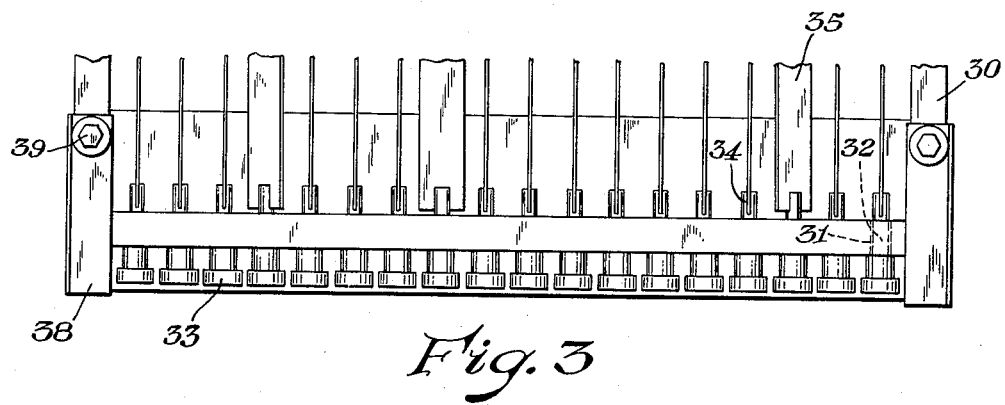
Fig. 3 is a fragmentary view of a reflector plate assembly, seen from the outer side, disposed away from the mandrel.
Figure 4:
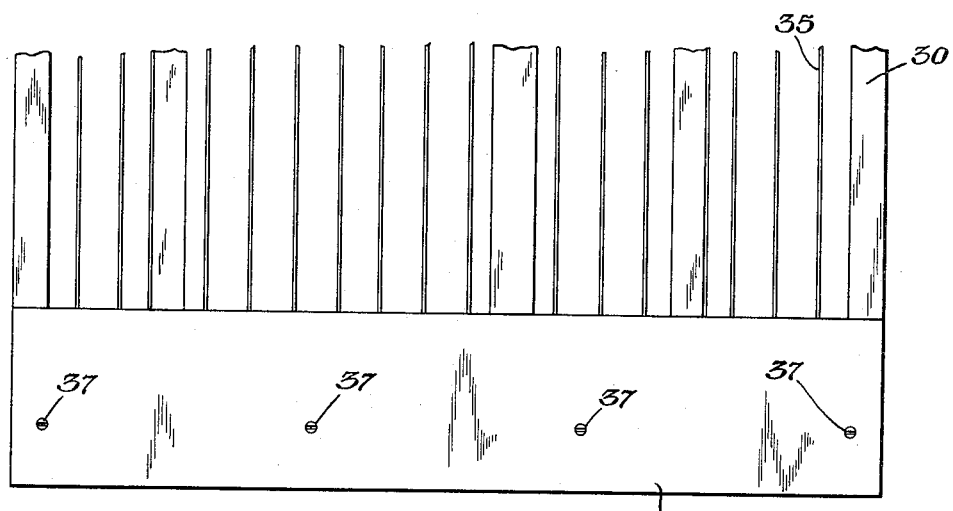
Fig. 4 is a similar fragmentary view of the reflector plate assembly of Fig. 3, seen from the inner side.

In the improvement of this invention one or more polished plates is mounted adjacent the mandrel 11 to serve as heat reflective surfaces, as mentioned above. It is preferred that the reflector plates be adjustable, to make it unnecessary to remove and remount them each time a new distribution of heat is encountered in the film. A satisfactory and preferred embodiment of an adjustable heat-reflective unit is shown in Figs. 3 and 4. In that embodiment, a rigid frame 30 has equally spaced holes 31 drilled vertically through its upper and lower edges. Rotatably fitted in holes 31 are shafts 32, which may have knurled knobs 33 at their outer ends and which may have slots 34 at their inner ends for receiving and holding narrow rectangular polished plates 35. Each of the many parallel plates 35 may be rotated individually to any position so that its face is disposed at any angle from 0° to 180° with respect to the plane of the film stretching mandrel. Heat radiated from any portion of the film may be allowed to pass between fully opened plates, or it may be reflected toward either side by partially opened plates, or it may be reflected back toward its source by a closed plate. These adjustments may be made as required without changing the mounting of the reflector assembly.

Plates 36 may be affixed, as by screws 37, to the top and bottom edges of the inner side of frame 30 for the dual purpose of increasing the reflecting area and shielding the knurled knobs 33.

It should be understood that the plate illustrated represents only an embodiment of a suitable apparatus and that other forms of the apparatus are possible. It is desirable that the reflector assembly, when mounted, not extend beyond the edge of the mandrel, to prevent overheating the portion of the tubular film which must contact the rollers 12.

For ease in mounting the reflector plates in position, brackets 38 may be attached to frame 30 with bolts 39. The brackets 38 may then be attached to any suitable rigid support for holding the plates in position.

Frame 30 should be mounted parallel to the mandrel 11 and less than 2 inches away from the mandrel 11, preferably about ½ inch. For best results, the frame 30 should be mounted from 12 to 18 inches from the die 10. When located further from the die, the film has time to cool which lessens the effectiveness of the reflector assembly.

In operation, a thermoplastic material, such as polystyrene, is expressed through a die 10 so as to form a tube of hot stretchable material. The tube then moves downward and over the spreader mandrel 11 which causes the tube to be transversely stretched. At the point where the tube comes into contact with the mandrel 11, an externally mounted air jet 14 directs a stream of air over that part of the tube which will contact the edges of the mandrel 11. This part of the film is cooled further by conduction from the cooling jackets 15. The film moves over the edges of the mandrel 11 on freely-rotating rollers 12 which minimize the friction of the film sliding over the edges. The film is stretched longitudinally by a pair of driven rolls 13 extending across the width of the mandrel 11. The tube is slit by razor blades so that two flat sheets are obtained. The plates 35 of this invention are mounted opposite the points on the mandrel 11 wherever thick sections of the film may occur. The knobs 33 may be turned so that the amount of heat dissipated from the film may be controlled evenly across the width of films.

When polystyrene film was prepared using the apparatus of this invention the maximum variation in gauge across the width of the film was 0.0003 inch.

By way of contrast, when a similar film was prepared without the reflecting plates the observed variation in gauge was 0.0013 inch.

We claim:
1. In apparatus in which a molten thermoplastic is extruded downwardly from an extrusion orifice in tubular form and stretched about a flat spreader having two parallel plane faces to form thin film, the improvement which consists in adjustable heat reflective elements disposed parallel to and not over 2 inches from a plane face of the film stretcher, each such reflector having a plurality of vertically disposed, individually adjustable metal vanes having smooth reflective surfaces, and means for rotating each such vane about its vertical axis to position its face at any angle from 0° to 180° with respect to the plane face of the film spreader to direct reflection of radiated heat from the adjacent hot film surface as required to adjust the thermoplasticity of the film to a substantially uniform value in the film stretching area.

2. Apparatus as claimed in claim 1, wherein a set of the adjustable reflective elements is disposed on each side of and parallel to both plane faces of the film spreader.

3. Apparatus as claimed in claim 1, wherein the heat reflective element is positioned about ½ inch from the said plane of stretched film.

4. Apparatus as claimed in claim 1, wherein the heat reflective element is positioned about 12 to 18 inches below the extrusion orifice.

References Cited in the file of this patent

UNITED STATES PATENTS

| 2,318,203 | Crosby | May 4, 1943 |
| 2,318,533 | Selvig | May 4, 1943 |

FOREIGN PATENTS

| 45,266 | France | July 22, 1935 |
| 655,014 | Germany | Aug. 7, 1936 |